(12) United States Patent
Ito

(10) Patent No.: US 6,682,157 B2
(45) Date of Patent: Jan. 27, 2004

(54) PANEL DRIVING DEVICE (75) Inventor: Yukio Ito, Nagoya (JP)

(73) Assignees: Autonetworks Technologies, Ltd., Aichi (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 4 days.

(21) Appl. No.: 10/051,119

(22) Filed: Jan. 22, 2002

(65) Prior Publication Data
US 2002/0101091 A1 Aug. 1, 2002

(30) Foreign Application Priority Data
Jan. 26, 2001 (JP) .......................... 2001-018002

(51) Int. Cl.$^7$ .............................................. A47B 88/00
(52) U.S. Cl. ................. 312/319.6; 312/319.2; 312/319.7; 312/319.8; 74/479.01; 74/490.08
(58) Field of Search .............................. 74/479.01, 422, 74/414, 421 A, 425, 490.07, 490.08, 22 R, 89.14, 89.16, 89.17; 312/319.2, 319.5–319.8; 455/345, 346, 348; 369/75.1, 77.1; 345/905; 361/600

(56) References Cited

U.S. PATENT DOCUMENTS

| | | | | |
|---|---|---|---|---|
| 5,177,730 A | * | 1/1993 | Utsugi .................... 369/75.1 |
| 5,362,144 A | * | 11/1994 | Shioya et al. ............. 312/319.6 |
| 5,762,412 A | * | 6/1998 | Kim ...................... 312/319.2 |
| 5,815,468 A | * | 9/1998 | Muramatsu et al. .......... 369/2 |
| 5,847,685 A | * | 12/1998 | Otsuki .................... 345/87 |
| 5,982,637 A | * | 11/1999 | Noguchi .................. 361/814 |

FOREIGN PATENT DOCUMENTS

| JP | A 9-267699 | 10/1997 |
|---|---|---|
| JP | A 2000-190786 | 7/2000 |

* cited by examiner

Primary Examiner—Jack Lavinder
Assistant Examiner—Mariano Sy
(74) Attorney, Agent, or Firm—Oliff & Berridge, PLC (57) ABSTRACT A panel driving device turns an openable panel inside out by rotating the openable panel by 180° about a rotation center shaft and moving the rotation center shaft upward or downward during a specific period while the openable panel is rotated. The panel driving device is provided with a rotating mechanism for supporting the openable panel on a rotatable end of a rotary arm and rotating the openable panel, and a torque converting mechanism for converting part of a driving force of the rotating mechanism into a rotating force for rotating the rotary arm only during the specific period to rotate the rotary arm upward or downward. The openable panel can be turned inside out by a simple construction.

18 Claims, 11 Drawing Sheets

PANEL DRIVING DEVICE

BACKGROUND OF THE INVENTION

This invention relates to a device for opening and closing an openable panel provided in a passenger's compartment for operation or display.

In recent years, it has been studied to store a disk or the like behind a panel for operation or display and take it in and out when the panel is opened and further to turn the panel inside out by constructing the panel to open and close in an audio equipment or navigation equipment installed in a vehicle.

For example, Japanese Unexamined Patent Publication No. 2000-190786 discloses a device constructed as follows. This device is provided with a first lever and a second lever which are rotatable independently of each other. One vertical end of an openable panel is rotatably coupled to the second lever, and a gear is so provided between a pinion mounted on a rotatable shaft of the second lever and a gear formed on the first lever as to mesh with the pinion and the gear. By the mutually independent rotations of the respective levers, an operation of elevating one vertical end of the openable panel and an operation of relatively rotating the openable panel with respect to the first lever are performed in parallel. The openable panel is turned inside out by the combination of the above two operations, thereby preventing a theft.

In the device disclosed in the above publication, in order to cause the first and second levers to move relative to each other at predetermined timings, quite a few number of gears have to be arranged and an irregularly shaped gear plate has to be provided in addition to the two levers. Further, the gear has to be formed on the outer circumferential surface of the first lever. Accordingly, an operation of assembling the above device is very cumbersome and costly. Further, since the number of the gears is large, the panel largely shakes due to a total sum of backlashes and a maloperation is likely to occur.

SUMMARY OF THE INVENTION

It is an object of the present invention to provide a panel driving device which is free from the problems residing in the prior art.

According to an aspect of the invention, a panel driving device is adapted for rotating an openable panel by 180° about a horizontal axis with the vertical end thereof as a point of support and turning the openable panel inside out by moving the point of support of the openable panel toward the opposite vertical side during the specific period while the openable panel is rotated. The panel driving device comprises: a supporting member; a rotary arm rotatably supported on the supporting member about a transverse axis, the rotary arm having a rotatable end rotatably coupled to a vertical end of a side of an openable panel; a rotating mechanism for relatively rotating the openable panel with respect to the rotary arms; and a torque converting mechanism for converting part of a driving force of the rotating mechanism into a rotating force for rotating the rotary arms only during a specific period to rotate the rotary arms upward and downward.

These and other objects, features and advantages of the present invention will become more apparent upon a reading of the following detailed description and accompanying drawings.

DETAILED DESCRIPTION OF THE PREFERRED EMBODIMENTS OF THE PRESENT INVENTION

One preferable embodiment of the present invention is described with reference to the accompanying drawings. A shown openable panel (hereinafter, merely "panel") 10 has a display provided on its front surface and has switches provided on its rear surface, and is placed inside a frame 12 opening forward. This frame 12 is assembled into an unillustrated instrument panel provided in a passenger's compartment, thereby forming an aperture opening forward. The panel 10 is so placed in the frame 12 as to open and close this aperture.

A chassis 14 which is a fixed-side supporting member is fixedly attached to the rear surface of the frame 12. The chassis 14 is integrally provided with a horizontally extending bottom wall (horizontal base plate) 14a and left and right side walls (side plates) 14b standing from the left and right ends of the bottom wall 14a. A space for accommodating an unillustrated audio equipment and the like is defined inside the bottom wall 14a and the side walls 14b.

A supporting slider 51 which is a movable-side supporting member is slidably mounted on the bottom wall 14a of the chassis 14 in forward and backward directions, and a pair of transversely arranged rotary arms 16A, 16B for supporting the panel 10 are rotatably supported by the supporting slider 51.

The supporting slider 51 is integrally provided with a bottom wall 51a extending substantially over the entire width of the chassis 14 and side walls 51b standing from left and right sides of the bottom wall 51a. The rotary arms 16A, 16B have their rear ends supported on the side walls 51b so as to be rotatable about a transversely extending support shaft 49.

Through holes 51e, 51c oblong in forward and backward directions are respectively formed in the bottom wall 51a and the side walls 51b of the supporting slider 51. The supporting slider 51 is precisely guided in forward and backward directions by fitting rollers 55 provided on the bottom wall 14a of the chassis 14 in the through holes 51e and rollers 54 provided on the side walls 14b of the chassis 14 in the through holes 51c.

Further, upward projecting protrusions 51d, 14d are formed at the rear end of the bottom wall 51a of the supporting slider 51 and at the front end of the bottom wall 14a of the chassis 14. These protrusions 51d, 14d are coupled to each other via a tension spring (biasing member) 56, and the supporting slider 51 is biased forward, i.e., in such a direction as to rotate the rotary arms 16A, 16B upward by the resilient force of the tension spring 56, thereby offsetting a biasing force and a downward acting rotating force due to the weights of the rotary arms 16A, 16B.

On the left and right side walls 14b of the chassis 14 is provided a cam mechanism for translating sliding movements of the supporting slider 51 and the bottom ends of the rotary arms 16A, 16B into rotary movements of the rotary arms 16A, 16B about the support shaft 49.

Figure 1:
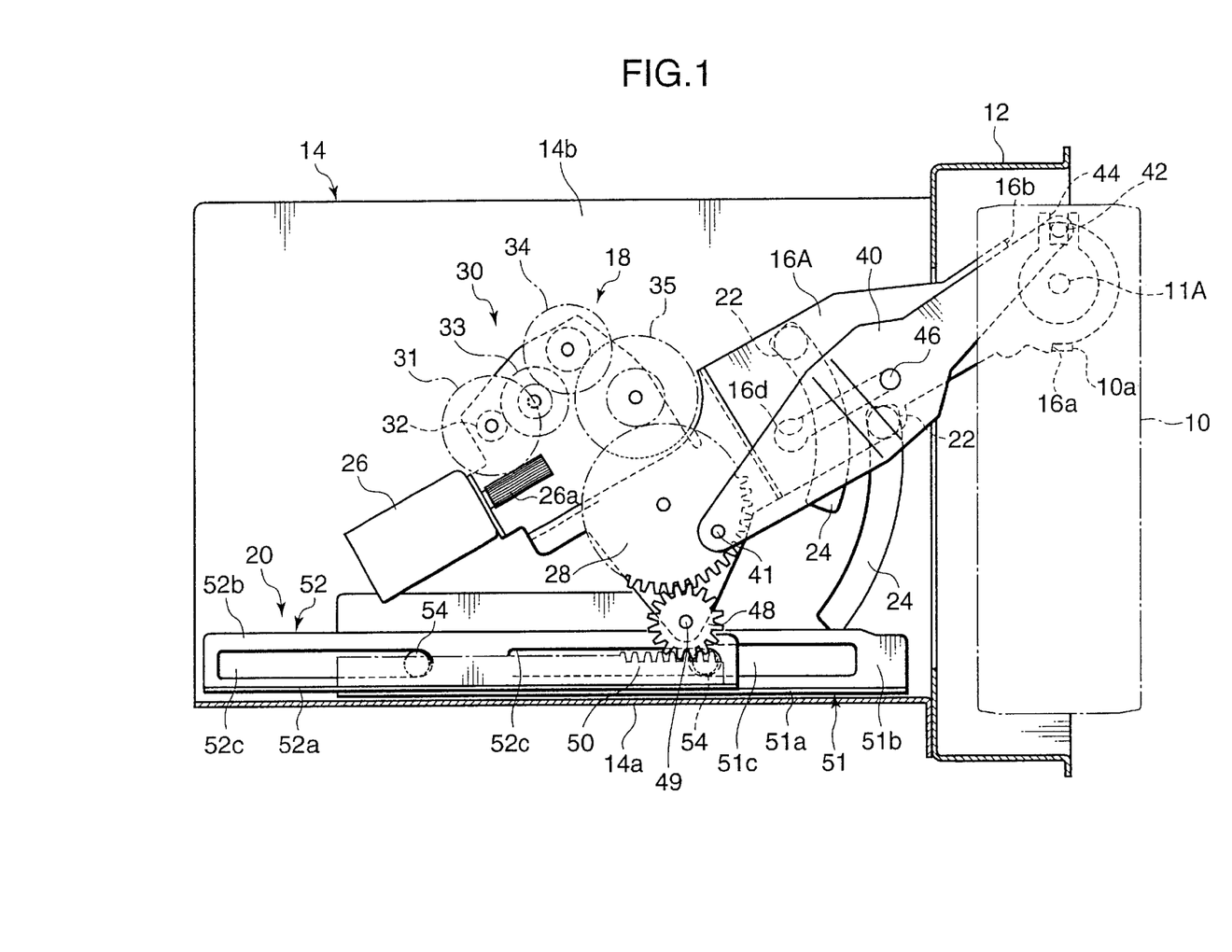
FIG. 1 is a side view in section showing an initial state of a panel driving device according to one embodiment of the invention from inner side of a rotary arm.
Figure 2:
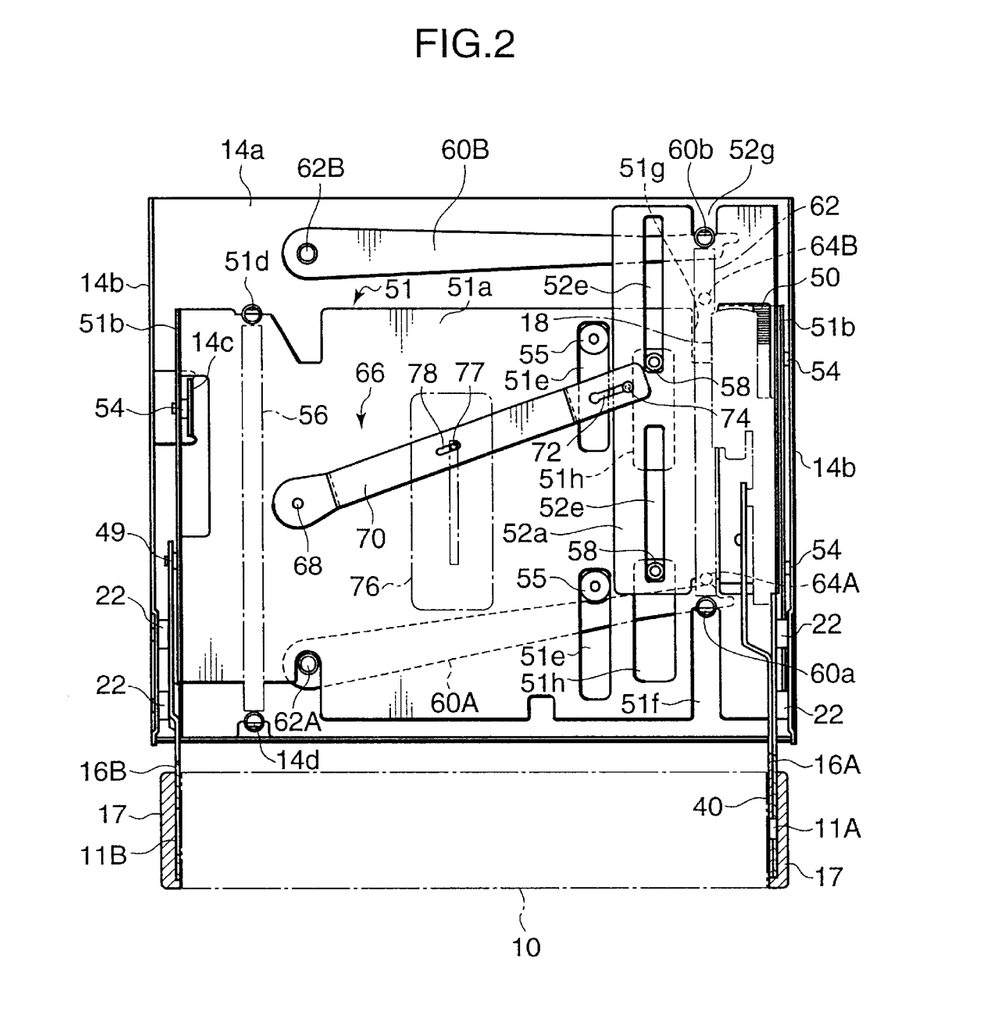
FIG. 2 is a plan view in section showing the initial state of the panel driving device.
Figure 3:
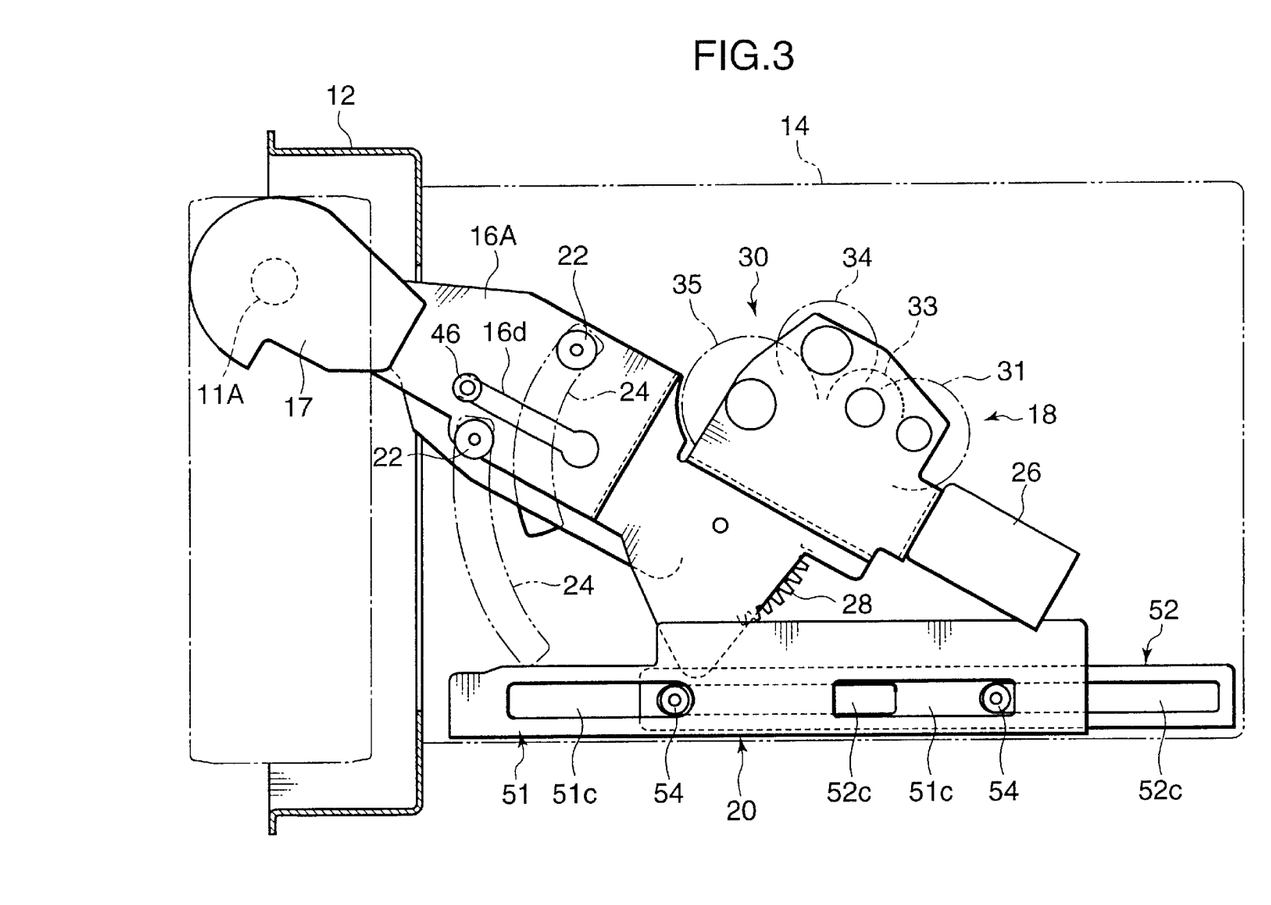
FIG. 3 is a side view partly in section showing the initial state of the panel driving device from outer side of the rotary arm.
Figure 8:
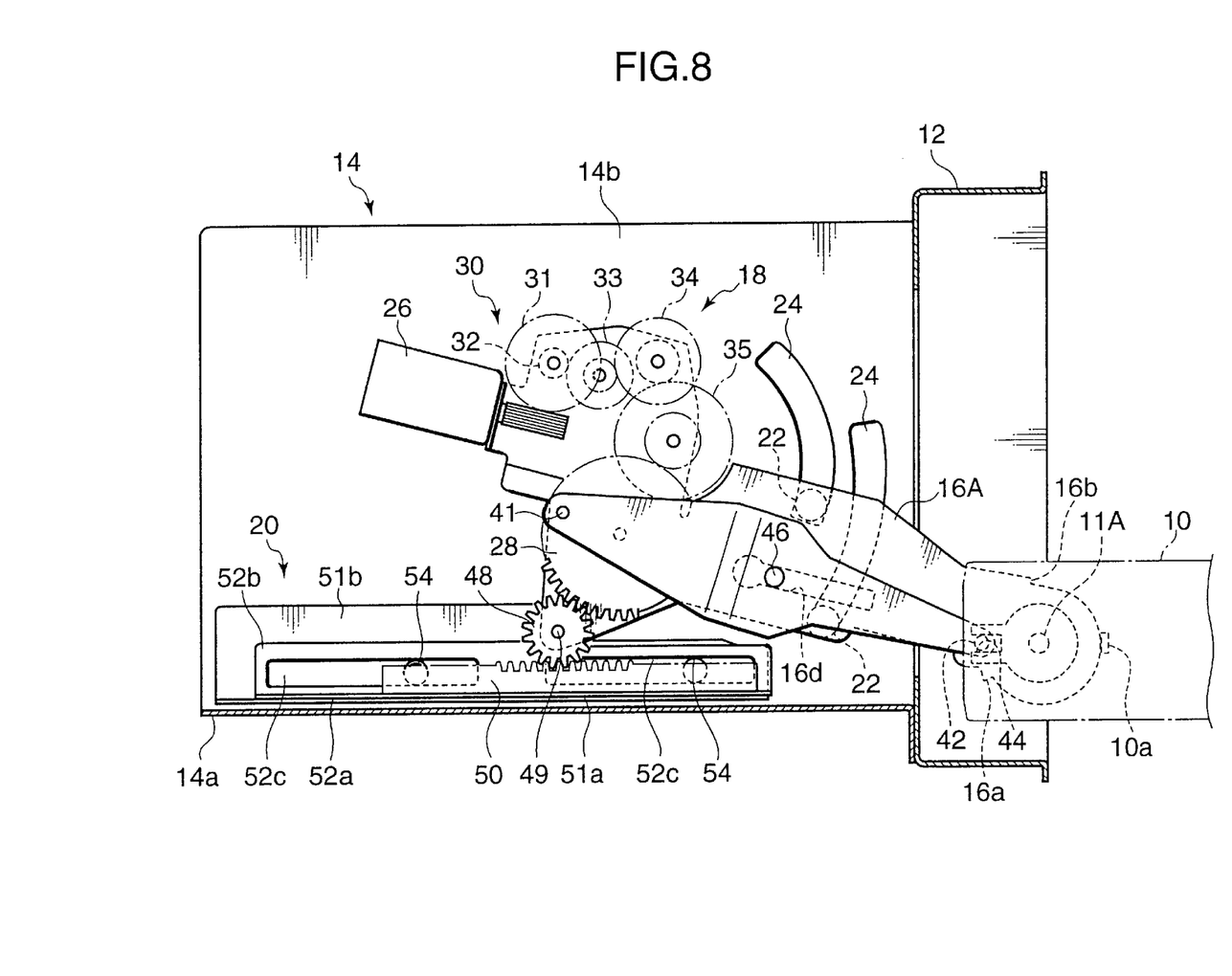
FIG. 8 is a side view in section showing fully opened state of the openable panel.
Figure 10:
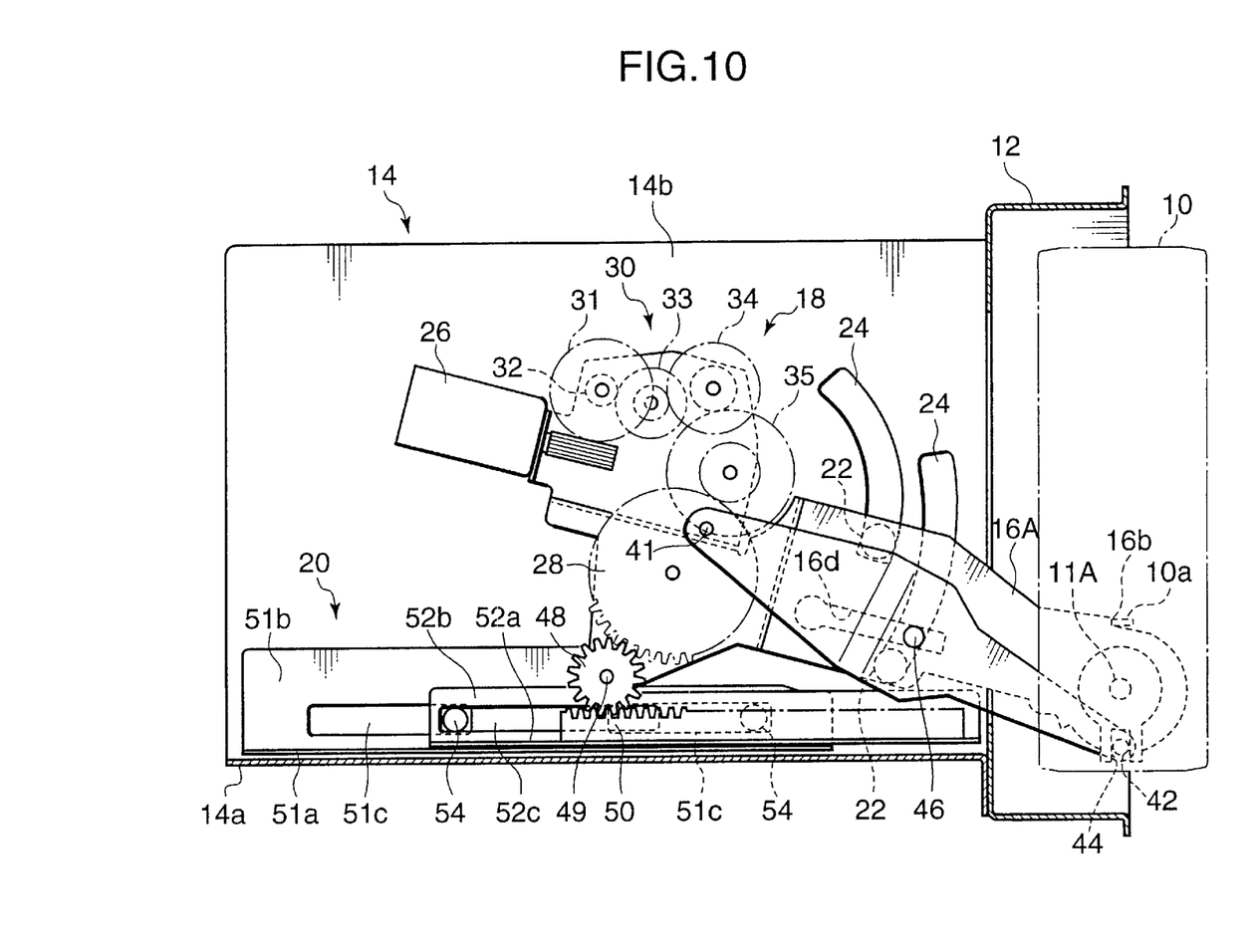
FIG. 10 is a side view in section showing a state where the openable panel is closed inside out.

Specifically, rotatable rollers (cam followers) 22 are mounted on the outer surfaces of the rotary arms 16A, 16B, and arcuate grooves 24 into which the respective rollers 22 are fittable are formed in the side walls 14b. The rotary arms 16A, 16B pivot about a transverse axis only by a specified stroke (i.e., stroke restricted by the length of the grooves 24) by the movements of the respective rollers 22 along the grooves 24 by the length of arcs defined by the grooves 24. As a result, the front ends of the rotary arms 16A, 16B are moved upward and downward between an uppermost position as shown in FIG. 1 and a bottommost position as shown in FIGS. 8 and 10.

The same function can be obtained even if the rollers 22 are provided on the side walls 14b of the chassis 14 and the cam grooves 24 are formed in the rotary arms 16A, 16B.

The panel 10 has one vertical end (upper end in the state of FIG. 1) of each of its left and right sides rotatably supported on the rotatable end (front end) of the rotary arm 16A, 16B. More specifically, rotation center shafts 11A, 11B project out from the left and right surfaces of the panel 10 and are fitted into round holes formed in the rotary arms 16A, 16B, thereby rotatably coupling the panel 10 and the rotary arms 16A, 16B relative to each other. The rotation center shafts 11A, 11B coupled to the rotary arms 16A, 16B are covered by covers 17 from outside.

Figure 5A:
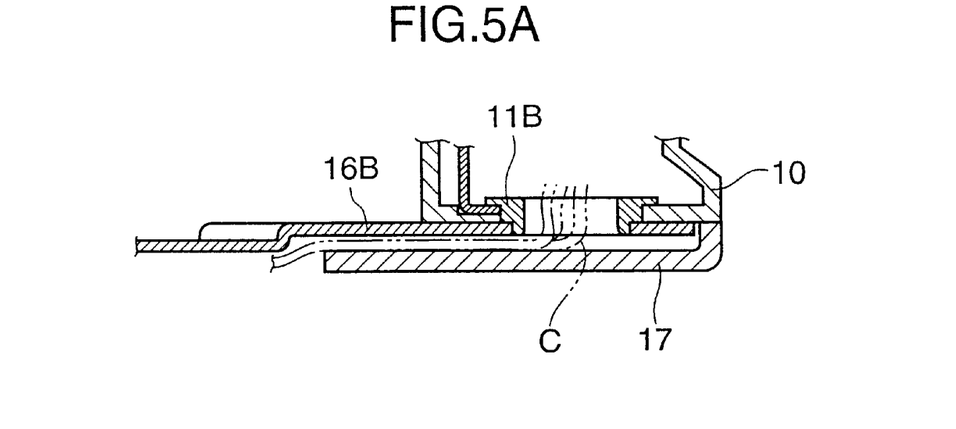
FIGS. 5A and 5B are a plan view in section and a side view showing a construction of one side of an openable panel near rotation center shaft in the panel driving device, respectively.
Figure 5B:
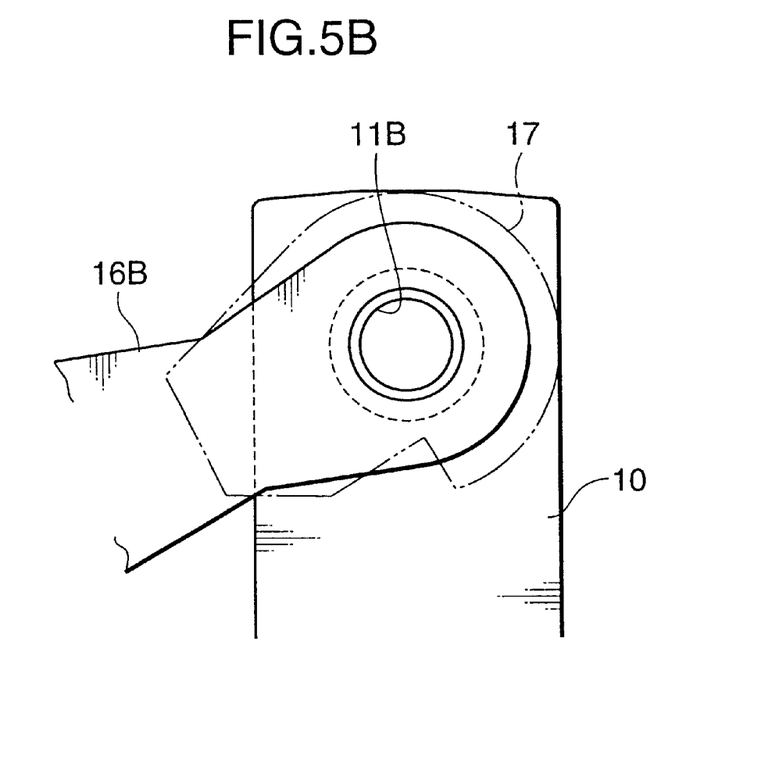

Further, as shown in FIGS. 5A and 5B, the rotation center shaft 11B coupled to the rotary arm 16B has a cylindrical shape, and wires C are drawn out from circuits provided in the panel 10 through the inside of the shaft 11B, and the cover 17 is so mounted on the outer surface of the rotary arm 16B as to cover the wires C from outside and press them. The wires C are drawn out backward along the cover 17.

The rotation center shaft 11B may be so coupled as to be rotatable with respect to the rotary arm 16B. However, a construction in which the shaft 11B and the rotary arm 16B are so coupled as not to be relatively rotatable and the shaft 11B is so mounted on the panel 10 as to relatively rotatable with respect to a main frame of the panel 10 is more preferable. By taking such a construction, abrasion of the wires C resulting from the relative rotation of the rotary arm 16B and the shaft 11B can be avoided.

On the other hand, stepped portions 16a, 16b are formed on the outer surface of the rotary arm 16A at positions spaced apart by 180°, and a projection 10a is formed on the side surface of the panel 10. By this construction, a relatively rotatable range of the panel 10 with respect to the rotary arm 16A is restricted to a range defined between a position where the stepped portion 16a and the projection 10a are in contact as shown in FIG. 1 (front-faced closed position) and a position where the stepped portion 16b and the projection 10a are in contact as shown in FIG. 10 (rear-faced closed position).

Further, the rotary arm 16A is provided with a rotating mechanism 18 for relatively rotating the panel 10 with respect to the rotary arms 16A, 16B.

This rotating mechanism 18 includes a motor 26 as a driving source, a large gear 28 for driving the panel 10, a gear train 30 and a torque transmission arm (torque transmitting portion) 40.

The motor 26 is fixedly attached to the rear end of the rotary arm 16A, and a worm 26a is provided on an output shaft thereof.

Figure 4:
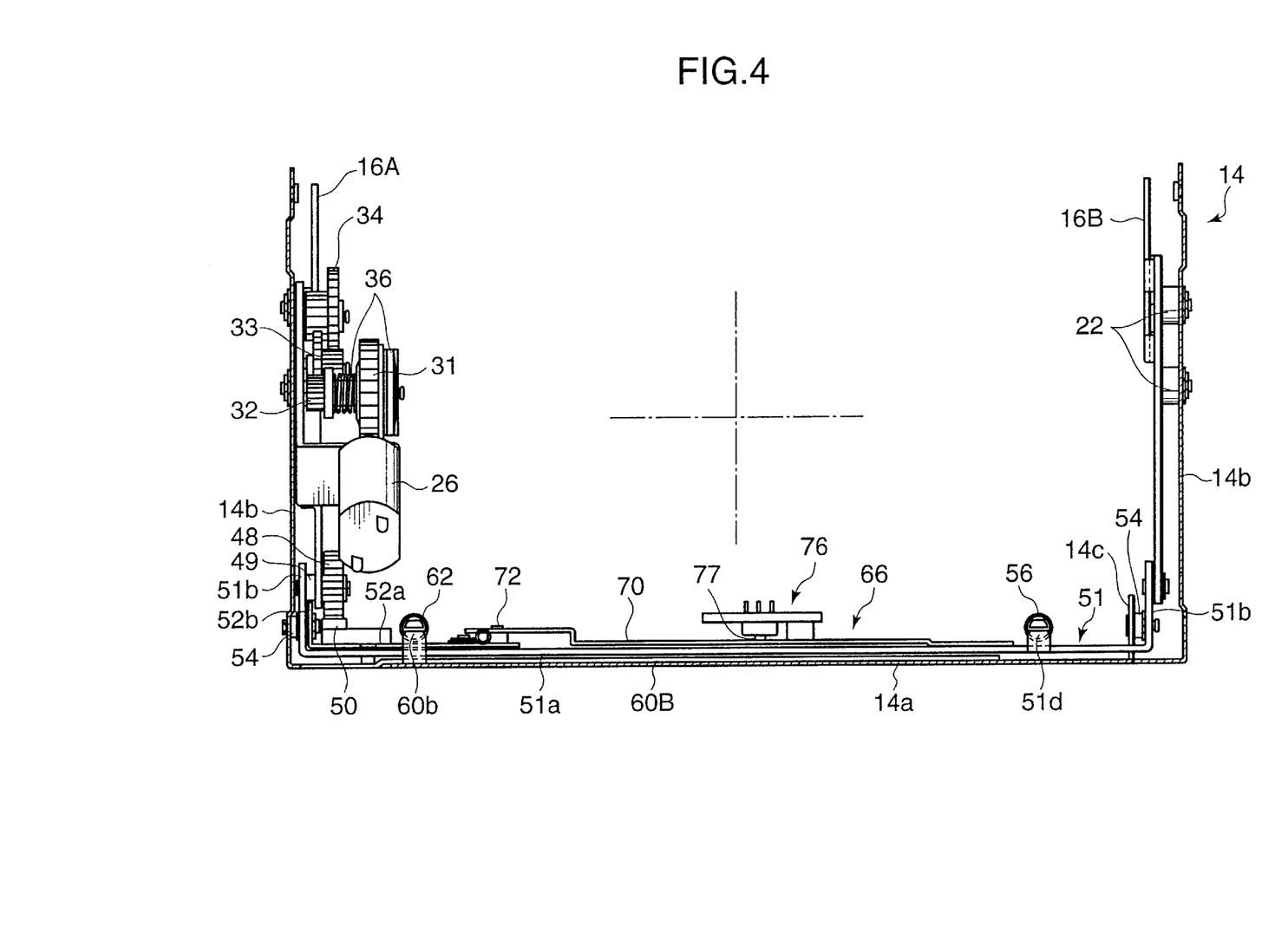
FIG. 4 is a rear view in section showing the initial state of the panel driving device.

The gear train 30 transmits a torque of the motor 26 to the large gear 28 and is comprised of a worm wheel 31 in mesh with the worm 26a, a spur gear 32 coaxially rotatable with the worm wheel 31, a plurality of double gears 33, 34, 35, wherein the most downstream double gear 35 is in mesh with the large gear 28. A torque limiter 36 (see FIG. 4) including a spring and the like is provided between the worm wheel 31 and the spur gear 32.

The torque transmission arm 40 transmits the torque of the large gear 28 to the panel 10, and has its rear end relatively rotatably coupled to an outer peripheral portion of the large gear 28 via a pin 41 while having a pin 42 provided on its front end. Near the rotation center shaft 11A of the panel 10 is, on the other hand, formed a slot extending in a radial direction of the shaft 11A. The front end of the torque transmission arm 40 and the panel 10 are so coupled as to be relatively rotatable by fitting the pin 42 into the slot 44. Further, a pin 46 is provided at a middle position of the torque transmission arm 40 and is fitted in an oblong hole 16d formed in the rotary arm 16A. The torque transmission arm 40 is relatively rotated with respect to the rotary arm 16A while the pin 46 linearly moves along this oblong hole 16d.

In this mechanism, the torque of the large gear 28 is converted into rotation of the panel 10 about the rotation center shafts 11A, 11B with the large gear 28 as a crank and the torque transmission arm 40 as a coupling bar.

The panel driving device is also provided with a torque converting mechanism 20 for converting part of the driving force of the rotating mechanism 18 into a force for rotating the rotary arm 16A only during a specific period.

This torque converting mechanism 20 includes a pinion 48 and a rack 50 in mesh with each other. The pinion 48 is so mounted on the support shaft 49 of the rotary arm 16A as to be rotatable about the support shaft 49, and is in mesh with the large gear 28 of the rotating mechanism 18. Accordingly, the rotation of the pinion 48 is linked with that of the large gear 28, and the pinion 48 is slidable forward and backward together with the rear end of the rotary arm 16A and the supporting slider 51.

On the other hand, the rack 50 is integrally fixed to a rack slider 52 while extending in forward and backward directions. This rack slider 52 is placed on the supporting slider 51 and is slidable relatively forward and backward with respect to the supporting slider 51. The rack slider 52 integrally includes a bottom wall 52a provided near the rotary arm 16A and a side wall 52b standing from one lateral end (toward the rotary arm 16A) of the bottom wall 52a immediately inside the side wall 51b of the supporting slider 51. The rack 50 is fixedly attached onto the bottom wall 52a while extending in forward and backward directions, and the heights of the pinion 48 and the rack 50 are set such that the rack 50 and the pinion 48 are meshable with each other.

The bottom wall 52a and the side wall 52b of the rack slider 52 are respectively formed with through holes 52e, 52c oblong in forward and backward directions. Rollers 58 projecting upward from the bottom wall 14a of the chassis 14 through holes 51h formed in the supporting slider 51 are fitted into the through holes 52e, whereas rollers 54 provided on the side wall 14b of the chassis 14 are fitted into the through holes 52c, with the result that the rack slider 52 can be precisely guided in forward and backward directions.

Figure 7:
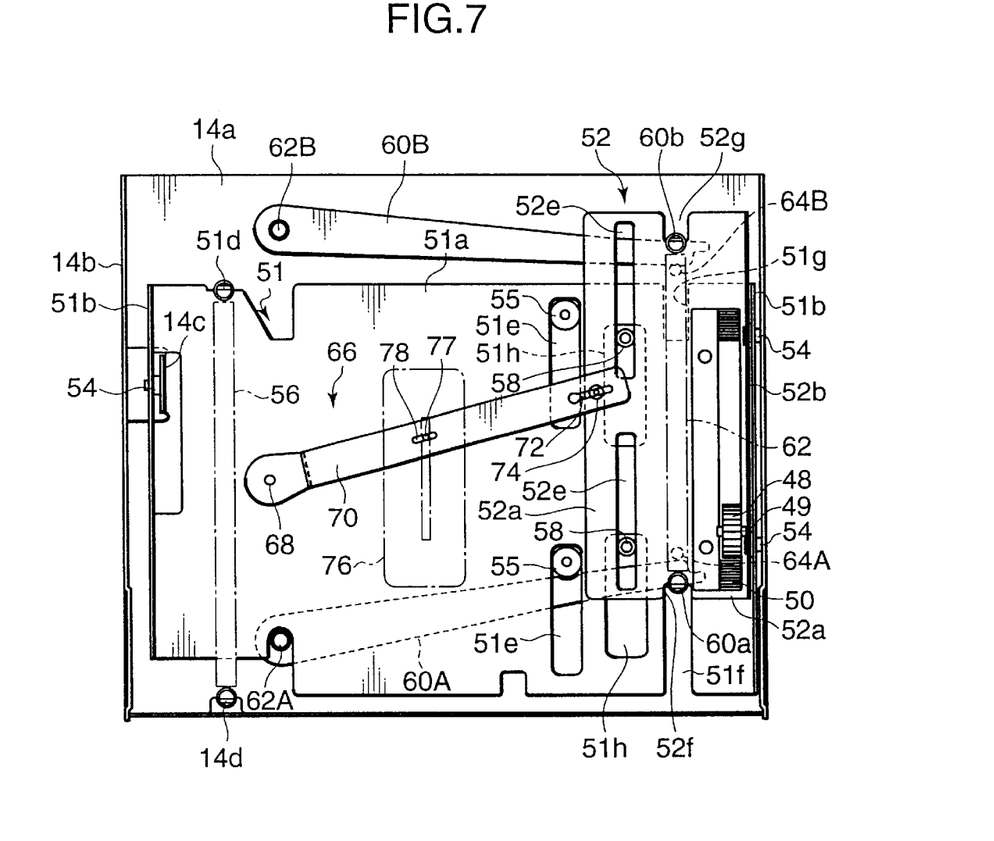
FIG. 7 is a plan view in section showing the state of FIG. 6.

This rack slider 52 is resiliently held at a specific position shown in FIG. 7 by a holder. The construction of the holder is as follows.

A front restricting arm (front restricting member) 60A and a rear restricting arm (rear restricting member) 60B which extend substantially in transverse direction are provided at a position further below the supporting slider 51. Ends of the respective restricting arms 60A, 60B toward the rotary arm 16B are so mounted on the bottom wall 14a of the chassis 14 as to be rotatable about vertical shafts 62A, 62B, and ends (rotatable ends) thereof toward the rotary arm 16A are formed with protrusions 60a, 60b projecting upward.

On the other hand, the bottom wall 52a of the rack slider 52 is formed with a notch 52f extending backward from the front end of the bottom wall 52a and a notch 52g extending forward from the rear end thereof. The protrusion 60a of the front restricting arm 60A is fittable into the front notch 52f from front, whereas the protrusion 60b of the rear restricting arm 60B is fittable into the rear notch 52g from behind.

The bottom wall 14a of the chassis 14 is provided with a pair of front and rear stoppers (projections) 64A, 64B. The rotatable end of the front restricting arm 60A comes into contact with the front stopper 64A from front, thereby being prevented from moving further backward, whereas the end of the rear restricting arm 60B comes into contact with the rear stopper 64B from behind, thereby being prevented from moving further forward.

The protrusions 60a, 60b of the two restricting arms 60A, 60B are coupled via a tension spring 62. By the resilient force of the tension spring 62, the front restricting arm 60A is biased in such a direction as to come into contact with the front stopper 64A (backward) and, simultaneously, the rear restricting arm 60B is biased in such a direction as to come into contact with the rear stopper 64B (forward).

The depths of the notches 52f, 52g of the rack slider 52 are set such that the respective protrusions 60a, 60b are in contact with the back ends of the notches 52f, 52g with the respective restricting arms 60A, 60B held in contact with the stoppers 64A, 64B as shown in FIG. 7. Thus, this rack slider 52 is resiliently held at the specific position shown in FIG. 7 by the resilient force of the tension spring 62 and is subjected to a resilient resistance by the tensile force of the tension spring 62 when leaving this specific position in either forward or backward direction.

Similar to the notches 52f, 52g, the supporting slider 51 is formed with notches 51f, 51g into which the protrusions 60a, 60b are fittable. These notches 51f, 51g are formed merely to avoid interference of the supporting slider 51 with the protrusions 60a, 60b, and the depths thereof are sufficiently large lest the protrusions 60a, 60b should come into contact with the back ends of the notches 51f, 51g.

At a position immediately above the two sliders 51, 52 is provided a position detector 66 for detecting relative positions of the sliders 51, 52. This detector 66 includes a sensor arm 70 and a linear sensor 76 for detecting a rotating angle position of the sensor arm 70.

The sensor arm 70 has one end thereof rotatably coupled to the bottom wall 51a of the supporting slider 51 via a pin 68 while having the other end (rotatable end) thereof coupled to the bottom wall 52a of the rack slider 52. Specifically, a through hole 72 oblong in the longitudinal direction of the sensor arm 70 (radial direction of rotation) is formed in the rotatable end of the sensor arm 70, and the rotatable end of the sensor arm 70 and the bottom wall 52a of the rack slider 52 are coupled by a pin 74 extending through the through hole 72. Accordingly, the angle of rotation of the sensor arm 70 corresponds to the relative positions of the supporting slider 51 and the rack slider 52.

The linear sensor 76 is provided at a position immediately above a middle portion of the sensor arm 70, and an input shaft 77 slidable in forward and backward directions projects down from a sensor main body and is fitted in an oblong through hole 78 formed in the middle portion of the sensor arm 70. Thus, the input shaft 77 is slid forward or backward as the sensor arm 70 is rotated, and the sliding position thereof is detected by the linear sensor 76 to detect the angle of rotation of the sensor arm 70, i.e., the relative positions of the supporting slider 51 and the rack slider 52 with respect to forward and backward directions.

Next, the functions of this panel driving device are described.

1) Initial State

FIGS. 1 to 4 show a state where the panel 16 is closed while the front surface thereof is facing forward (initial state). In this state, the front ends of the rotary arms 16A, 16B are at their uppermost positions (i.e., the rollers 22 are pressed against the upper ends of the grooves 24), and the panel 10 is stopped at the position where the projection 10a of the panel 10 is in contact with the stepped portion 16a of the rotary arm 16A and closes the aperture of the frame 12 while hanging down from the front ends of the rotary arms 16A, 16B.

Figure 6:
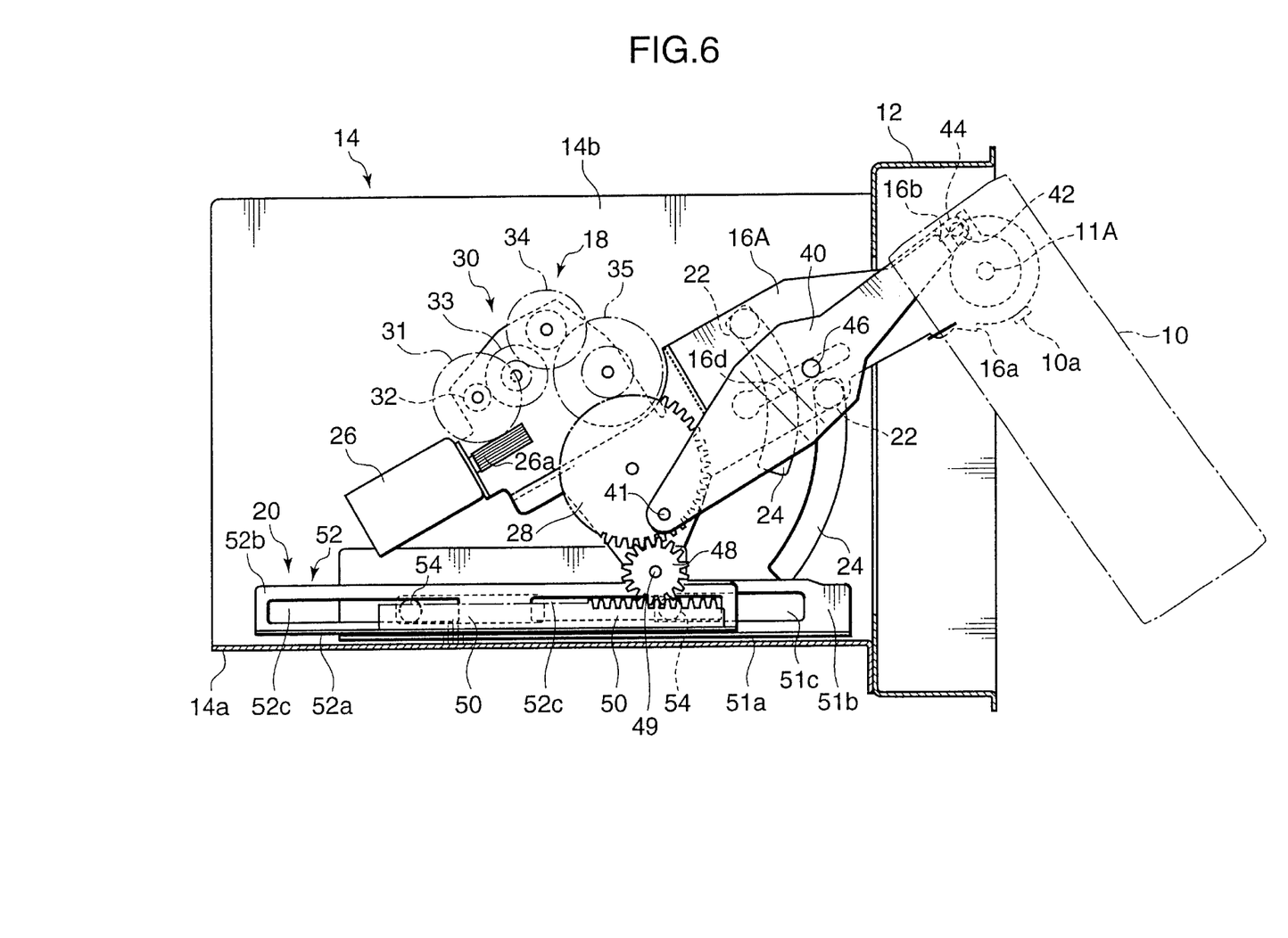
FIG. 6 is a side view in section showing a state reached by rotating the openable panel by a specified angle in an opening direction from the initial state.

On the other hand, the supporting slider 51 and the support shaft 49 at the rear ends of the rotary arms 16A, 16B supported on the supporting slider 51 are located at their most forward positions, and the rack 50 in mesh with the pinion 48 mounted on the support shaft 49 and the rack slider 52 to which the rack 50 is fixed are located at positions more backward than the specific position shown in FIGS. 6 and 7 against the tensile force of the tension spring 62.

Specifically, in the initial state, the rotatable end of the front restricting arm 60A is in abutment against the front stopper 64A from front; the protrusion 60b of the rear restricting arm 60B is in abutment against the back end of the notch 52g of the rack slider 52; and the rack slider 52 is moved back to a position where the rear restricting arm 60B is moved backward away from the rear stopper 64B by pulling back the tension spring 62 coupled to the rear restricting arm 60B and the front restricting arm 60A. The rack slider 52 is so biased as to move forward by the resilient tensile force of the tension spring 62, thereby canceling backlashes between the rack 50 and the pinion 48 and between other gears. As a result, the shake of the panel resulting from these backlashes can be prevented.

2) Start of Rotation of the Panel 10

By starting the motor 26 in the initial state, the torque of the motor 26 is transmitted to the panel 10 via the gear train 30, the large gear 28 and the torque transmission arm 40, and the panel 10 starts rotating about the rotation center shafts 11A, 11B in such a direction that the bottom end thereof bulges out forward (see FIG. 6)

On the other hand, the pinion 48 is rotated as the large gear 28 is rotated. The rack 50 in mesh with the pinion 48 and the rack slider 52 to which the rack 50 is fixed slide in a direction returning to the specific position shown in FIGS. 6 and 7 (position where the rotatable end of the rear restricting arm 60B is in contact with the rear stopper 64B) by the resilient tensile force of the tension spring 62 (i.e., move forward). Thus, the pinion 48 rotates only at the same position without sliding in forward and backward directions. Therefore, only the panel 10 is relatively rotated with respect to the rotary arms 16A, 16B without rotating the rotary arms 16A, 16B.

3) Driving of the Rotary Arm 16A

When the supporting slider 51 reaches the specific position shown in FIGS. 6 and 7 (i.e., a position where the two restricting arms 60A, 60B are in contact with the stoppers 64A, 64B and the tension spring 62 connecting the two restricting arms 60A, 60B is shortest), the forward-acting tensile force of the tension spring 62 is canceled, with the result that the rack slider 52 and the rack 50 fixed to the rack slider 52 are stopped. On the other hand, since the pinion 48 in mesh with the rack 50 continues to rotate, this pinion 48 rolls backward on the rack 50 and starts sliding backward together with support shaft 49 on which the pinion 48 is mounted, the supporting slider 51 on which the support shaft 49 is mounted, and the rear end of the rotary arm 16A supported on the support shaft 49. As a result, the two rotary arms 16A, 16B start rotating in such a direction that the front ends thereof move downward while the rollers 24 thereof move downward along the grooves 22. In other words, it is simultaneously performed to drive the panel 10 to rotate about the rotation center shafts 11A, 11B and to drive the rotary arms 16A, 16B to lower the rotation center shafts 11A, 11B.

At this time, since a forward-acting biasing force (i.e., a force to rotate the rotary arm 16a, 16B upward) is given to the supporting slider 51 by the resilient tensile force of the tension spring 62, the stable rotation of the rotary arms 16A, 16B can be realized by canceling this biasing force and a downward-acting rotating force due to the weights of the rotary arms 16A, 16B and the panel 10.

In this embodiment, the respective gears and the like are designed such that the panel 10 becomes substantially horizontal (i.e., the aperture of the frame 12 is open forward) when the rotation center shafts 11A, 11B reach their bottommost positions as shown in FIG. 8. In this state, the audio equipment or the like installed in the chassis 14 can be operated (e.g., a disk can be taken in and out).

4) End of Rotation of the Panel 10

Figure 9:
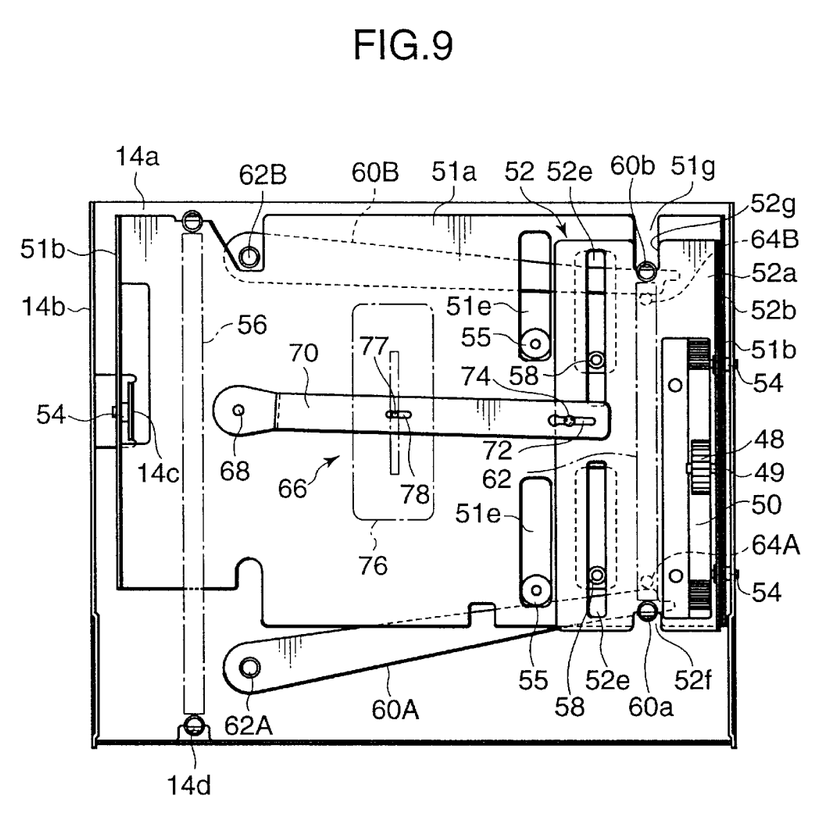
FIG. 9 is a plan view in section showing the state of FIG. 8.

When the front ends of the rotary arms 16A, 16B and the rotation center shafts 11A, 11B reach their bottommost positions (i.e., the rollers 22 are pressed against the bottom ends of the grooves 24) as shown in FIGS. 8 and 9, the rotary arms 16A and 16B cannot rotate any further. Thus, the rotation center shafts 11A, 11B stop at the bottommost positions, and the backward sliding movements of the pinion 48, the support shaft 49 at the rear end of the rotary arm 16A and the supporting slider 51 stop at the rearmost positions shown in FIGS. 8 and 9. Accordingly, only the rotation of the panel 10 about the rotation center shafts 11A, 11B continues from this time on. If such a rotation continues by 90°, the panel 10 returns to an upright position while being held inside out as compared to the initial state, and the panel 10 cannot rotate any further by the contact of the projection 10a of the panel 10 with the stepped portion 16b of the rotary arm 16A (see FIG. 10). At this point of time, the motor 26 is stopped to stop the panel 10.

Figure 11:
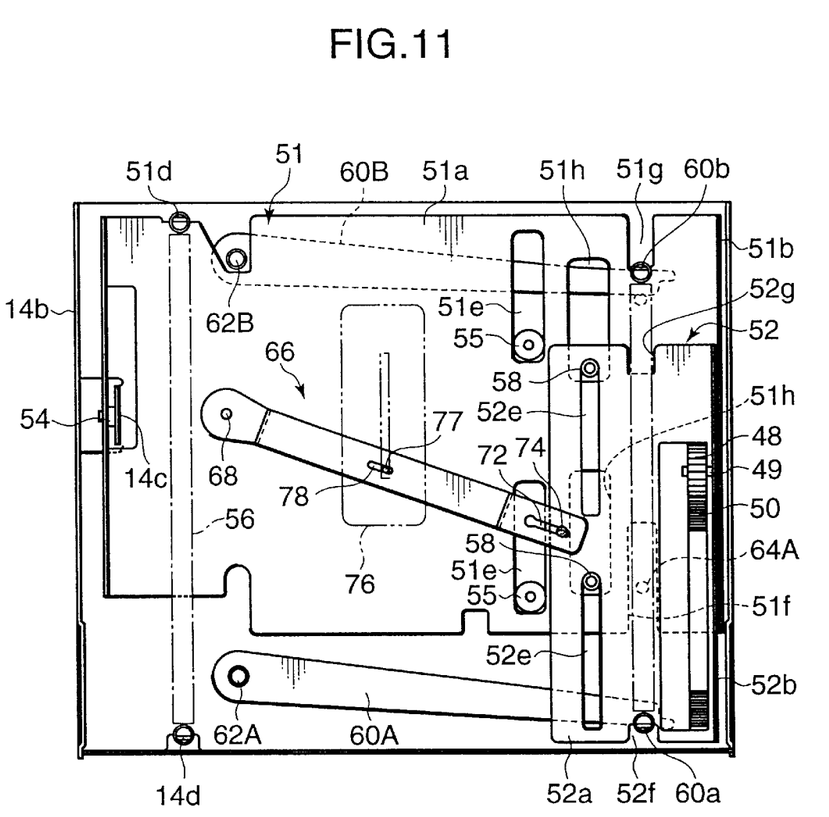
FIG. 11 is a plan view in section showing the state of FIG. 10.

On the other hand, since the pinion 48 continues to rotate although the sliding movements of the pinion 48 and the supporting slider 51 stop, the rack 50 in mesh with the pinion 48 and the rack slider 52 start moving forward from the specific position while rotating the front restricting arm 60A forward against the resilient tensile force of the tension spring 62 and stop at the same time the motor 26 is stopped (see FIG. 11). In this stopped state, a backward-acting biasing force is given to the rack 50 and the rack slider 52 by the resilient tensile force of the tension spring 62. Thus, similar to the initial state, backlashes between the respective gears are canceled and a shake of the panel 10 resulting from these backlashes can be prevented.

If the motor 26 is driven in reverse direction in this state where the panel 10 is held inside out, the panel 10 is returned to a state where the front surface thereof faces forward (initial state) by operations totally reverse of the above.

In the device described above, it is basically sufficient to drivingly rotate the panel 10 by the motor 26, and the rotation of the panel 10 about the rotation center shafts 11A, 11B and the elevation of the panel 10 can be performed at suitable timings by a simple construction for only converting part of the motor output into the driving force to rotate the rotary arm 16A only during the specific period. The panel 10 can be turned inside out by the combination of these operations.

Further, since the present position and posture of the panel 10 can be grasped only by detecting the relative positions of the supporting slider 51 and the rack slider 52 by means of the position detector 66, the drive control of the panel 10 can be easily performed by the simple detector.

The present invention is not limited to the foregoing embodiment and may be, for example, embodied as follows.

The specific period during which the rotary arms 16A, 16B are rotated can be freely set within a period during which the panel 10 is rotated by 180°. For example, the specific positions of the rack 50 and the rack slider 52 may be set such that the rotation of the rotary arms 16A, 16B is ended halfway after simultaneously starting the rotation of the panel 10 and that of the rotary arms 16A, 16B or the rotation of the panel 10 and that of the rotary arms 16A, 16B are simultaneously ended by starting the rotation of the rotary arms 16A, 16B later than that of the panel 10.

According to the present invention, part of the rotating mechanism may be provided at the supporting member (chassis 14). However, in such a case, it is difficult to transmit the torque from the supporting member to the rotary arm rotating relative to the supporting member and the mechanism becomes more complicated. If the rotating mechanism 18 is provided at the rotary arm 16A as in the foregoing embodiment, the torque can be more easily transmitted to the panel 10 and the construction can be simpler.

In the foregoing embodiment, instead of providing the sliders 51, 52, an electric stopper or a braking means for restricting the sliding movement of only the rack 50 during a specific period may be added and the operation thereof may be controlled by a computer. However, the construction as shown in the foregoing embodiment has an advantage that the rotation of the rotary arm 16A can be controlled by the simple construction taking advantage of the resilient force of the tension spring 62 without adding a special braking means.

In the foregoing embodiment, an arcuate internal spur gear having a large radius of a circle traced by teeth (?) may be, for example, brought into mesh with the pinion 48 instead of the rack 50. However, in such a case, the internal spur gear moves along an arc and a construction for supporting the internal spur gear and controlling its movement is complicated. The use of the rack 50 as shown is an advantage that the rack 50 can be supported and have its movement controlled by a simple construction since the rack 50 only slides in forward and backward directions.

The specific construction of the rotating mechanism does not matter according to the present invention. For example, a gear rotatable together with the panel 10 may be arranged around the output shaft and may be rotated using the motor and various torque transmitting mechanisms.

In the foregoing embodiment, the rack slider 52 and the rack 50 are held at the specific position shown in FIG. 7 by the combination of the two restricting arms 60A, 60B, the tension spring 62 and the front and rear stoppers 64A, 64B. However, the front and rear ends of the rack 50 may be, for example, coupled to the supporting member via springs and a position where the resilient forces of the two springs are balanced may be set as a specific position. Further, a cam rotatable as the rack 50 slides may be provided, and the rack 50 may be resiliently held at the specific position by pressing a roller against a recess of this cam at a suitable load.

The specific shape of the supporting member does not matter according to the present invention. For example, the shown chassis 14 may be shaped such that side plates extend downward from the opposite lateral ends of its ceiling wall. In such a case, an audio equipment or the like can be installed below the ceiling wall.

The specific application of the panel 10 does not matter according to the present invention. For example, switches may be provided both on the front and on the rear surfaces of the panel. If nothing is provided on the rear surface, the inventive device can be effectively applied in the case that the panel is turned inside out for the antitheft purpose.

As described above, an inventive panel driving device for rotating an openable panel by 180° about a horizontal axis with one vertical end thereof as a point of support and turning the openable panel inside out by moving the point of support of the openable panel toward the opposite vertical side during a specific period while the openable panel is rotated, comprises a supporting member, rotary arms rotatably supported on the supporting member about a transverse axis and each having rotatable end thereof rotatably coupled to one vertical end of a corresponding one of sides of the openable panel, a rotating mechanism for relatively rotating the openable panel with respect to the rotary arms, and a torque converting mechanism for converting part of a driving force of the rotating mechanism into a rotating force for rotating the rotary arms only during the specific period to rotate the rotary arms upward and downward.

With this construction, the rotating mechanism for rotating the openable panel and the torque converting mechanism for converting part of the driving force of the rotating mechanism into the rotating force of the rotary arms only during the specific period are provided in the panel driving device for turning the openable panel inside out by the rotation of the rotary arms supporting the openable panel and that of the openable panel. Thus, the rotary arms can be rotated at proper timings only by switching a state where the torque is converted and a state where the torque is not converted.

It is basically sufficient to rotate the openable panel with respect to the rotary arms about the point of support at the rotatable ends of the rotary arms, and the rotation of the openable panel about the point of support and the elevation of the point of support can be performed at suitable timings by a simple construction for only converting part of the driving force for rotating the openable panel into the driving force for rotating the rotary arms only during the predetermined specific period while the openable panel is being rotated. Therefore, as compared to prior art panel driving devices, the openable panel can be effectively turned inside out by a simple construction.

The specific period, i.e., a period during which the rotary arms are rotated, may be freely set within a period during which the openable panel is rotated by 180°. For example, the rotation of the rotary arms may be ended halfway by simultaneously starting the rotation of the openable panel and that of the rotary arms or the rotation of the openable panel and that of the rotary arms may be simultaneously ended by starting the rotation of the rotary arms later than that of the openable panel.

The rotating mechanism may be preferably provided on either one of the rotary arms. With such an arrangement, the torque can be directly transmitted from the rotary arms to the openable panel, enabling an even simpler construction.

In this openable panel, if wires connected with circuits inside the openable panel are drawn out, for example, through the rear surface of the panel, the wires are exposed to outside when the openable panel is turned by 180°. This spoils the appearance of the openable panel and the wire may be damaged by the rotation of the openable panel. Contrary to this, according to the inventive device, rotation center shafts are provided on the opposite sides of the openable panel, the openable panel is so supported on the left and right rotary arms as to be rotatable about the rotation center shafts, the rotation center shaft supported on the rotary arm opposite from the one provided with the rotating mechanism has a cylindrical shape, and wires are drawn out of the openable panel through the inside of the cylindrical rotation center shaft. With this construction, the openable panel can be rotated about the rotation center shafts without damaging the wires and exposing them on its front surface. Further, the rotating mechanism does not interfere with wiring.

If a cover mountable on the rotary arm in such a manner as to cover the cylindrical rotation center shaft and the wires drawn out through this rotation center shaft is provided, the appearance of the openable panel is better.

Various mechanism for rotating the rotary arms can be considered. For example, the supporting member includes a fixed-side supporting member and a movable-side supporting member slidable in forward and backward directions with respect to the fixed-side supporting member; the rear ends of the opposite rotary arms are rotatably supported on the movable-side supporting member so as to be rotatable about a transversely extending support shaft; the panel driving device further comprises a translating mechanism for translating sliding movements of the movable-side supporting member and of the rear ends of the rotary arms into rotary movements of the rotary arms; and part of the driving force of the rotating mechanism is converted into a sliding force for sliding the movable-side supporting member only during the specific period. With this construction, the rotary arms can be rotated only by a simple movement of sliding the movable-side supporting member forward and backward, and the rotating period of the rotary arms can be limited by sliding the movable-side supporting member only during the specific period.

If a biasing member for biasing the movable-side supporting member in such a direction as to rotate the rotary arm supported on the movable-side supporting member upward is provided, the rotary arms can be stably rotated both upward and downward by canceling a biasing force of the biasing member and a downward-acting force due to the weights of the rotary arms and the openable panel.

Further, the torque converting mechanism may be constructed by a cam groove formed in one of the rotary arm and the lateral plate and a cam follower formed in the other thereof and engageable with the cam groove. The rotating stroke of each rotary arm is restricted by the length of the cam groove. Such a torque converting mechanism also acts as a stroke restricter for the rotary arms.

In the case of the construction for rotating the rotary arms by the sliding movement of the movable-side supporting member as described above, the torque converting mechanism preferably includes a pinion which is rotatably mounted about a support shaft for the rotary arms and whose rotation is linked with the operation of the rotating mechanism, and a rack extending in forward and backward directions and slidably mounted on the supporting member in the same direction as the extension thereof, and is adapted to stop the sliding movement of the rack only during the specific period.

With this construction, the rotating period of the rotary arms can be specified only by switchingly causing the rack to slide and stopping its sliding movement.

In such a case, the rotating mechanism may preferably include a gear for driving the panel, a motor for rotating the gear and a torque transmitting portion for converting a rotating force of the gear into a panel rotating force, and the pinion is in mesh with the gear. With this construction, the gear can act both as a means for transmitting the torque to the openable panel and a means for distributing the driving force to the pinion and the rack.

In the case of the construction using the rack and the pinion, there may be preferably provided a stroke restricter for restricting rotating strokes of the rotary arms and a holder for resiliently holding the rack at the specific position. The rack moves in a direction returning to the specific position by a holding force of the holder as the pinion is rotated at an initial stage of the operation of the rotating mechanism. The rack is held at the specific position after the rack reaches the specific position. The rotary arms are rotated by the restricted strokes with the pinion and the rack held in mesh with each other. The rack moves in a direction away from the specific position against the holding force of the holder as the pinion is rotated after the rotary arms are rotated by the restricted strokes. With this construction, the rack is away from the specific position against the holding force of the holder with the openable panel closed, and the rack is biased by this holding force in a direction opposite from a panel closing direction. Thus, backlashes between the rack and the pinion and between the respective gears can be canceled by this biasing force.

The holder may preferably include a rack slider which is so provided as to be relatively slidable with respect to the fixed-side supporting member and the movable-side supporting member and is slidable together with the rack, a front and a rear restricting members which are arranged to hold the rack slider therebetween at front and rear sides and are so mounted on the supporting member as to be movable in forward and backward directions, a tension spring for coupling the front and rear restricting members in forward and backward directions, a front stopper for preventing the front restricting member from moving more backward than a specified position, and a rear stopper for preventing the rear restricting member from moving more forward than a specified position. The rack and the rack slider move in the direction returning to the specific position by a tensile force of the tension spring as the pinion is rotated at the initial stage of the operation of the rotating mechanism. The pinion is rotated with the rack and the rack slider held stationary after the rack and the rack slider reach the specific position. The movable-side supporting member and the pinion slide to rotate the rotary arms, and the rack slider moves in the direction away from the specific position against the tensile force of the tension spring as the pinion is rotated after the rotary arms are rotated by the restricted strokes.

With this construction, the rack slider and the rack can be resiliently held at the specific position by a simple construction of holding the rack slider by the front and rear restricting members from front and rear sides and coupling them by a tension spring.

In such a case, if the supporting member integrally includes a horizontal base plate and side plates vertically extending from the opposite lateral ends of the horizontal base plate, the movable-side supporting member and the rack slider are slidably mounted on the supporting member along the horizontal base plate, and the torque converting mechanism is provided on each of the lateral plates, a wide space can be defined inside the horizontal base plate and the left and right side plates, and a space for installing an audio equipment or the like can be easily secured behind the panel.

In the construction in which the rotating timings of the rotary arms are controlled using the movable-side supporting means and the rack slider as described above, the position of the openable panel and the relative positions of the movable-side supporting member and the rack slider are in one-to-one correspondence. Therefore, the present position and posture of the openable panel can be precisely grasped by a simple construction of providing a position detector for detecting the relative positions of the movable-side supporting means and the rack slider.

This application is based on patent application No. 2001-18002 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A panel driving device that rotates a panel having a pair of vertically extending opposite side planes, the panel driving device comprising:
  a support member;
  a pair of rotary arms, each having a first end pivotally connected, at a pivotal connection, to one end portion of a respective one of the side planes of the panel, and a second end pivotally supported by the support member;
  a rotation mechanism that generates a driving force to rotate the panel about the pivotal connections between the rotary arms and the panel;
  a torque conversion mechanism that causes the driving force of the rotating mechanism to turn the rotary arms for a specific time period such that the pivotal connections move vertically, the rotation mechanism rotating the panel between an upright position and a swung position, the vertical movement of the pivotal connections turning the panel between the swung position and a horizontally extending position, the driving force of the rotating mechanism rotating the panel further beyond the horizontally extending position until the panel reaches an inside out position wherein the panel has been rotated for 180 degrees from the upright position.

2. A panel driving device according to claim 1, wherein the rotation mechanism is mounted on either one of the rotary arms.

3. A panel driving device according to claim 2, wherein the first ends of the rotary arms are respectively connected with the one end portions of the panel through pivotal shafts, and one of the pivotal shafts is a cylindrical shaft and is coupled with the rotary arm on which the rotation mechanism is not mounted, and wires are drawn out of the panel through an inside of the cylindrical shaft.

4. A panel driving device according to claim 3, wherein the support member includes a fixed support member and a movable support member slidable in forward and rearward directions relative to the fixed support member; the second ends of the rotary arms are pivotally supported by the movable support member though transversely extending support shafts to rotate the rotary arms about the support shafts; the panel driving device further comprises a transformation mechanism that transforms the sliding movement of the movable support member into rotary movement of the rotary arms with the second ends of the rotary arms moving with the movable support member; and the driving force of the rotating mechanism is used for sliding the movable support member only during the specific period.

5. A panel driving device according to claim 4, wherein the torque converting mechanism includes a pinion which is rotatably supported on the transversely extending support shaft for the rotary arm on which the rotating mechanism is mounted, the pinion being linked with the rotating mechanism, and a rack engaging the pinion and extending in forward and backward directions, the rack being mounted on the support member to slide in the forward and backward directions, with its sliding movement being stopped at a specific position during the specific period to allow the movement of the pinion on the rack accompanying the second end of the rotary arm.

6. A panel driving device according to claim 4, further comprising a biasing member that urges the movable support member in a direction to upwardly rotate the rotary arms and which is supported by the movable support member.

7. A panel driving device according to claim 6, wherein the torque converting mechanism includes a pinion which is rotatably supported on the transversely extending support shaft for the rotary arm on which the rotating mechanism is mounted, the pinion being linked with the rotating mechanism, and a rack engaging the pinion and extending in forward and backward directions, the rack being mounted on the support member to slide in the forward and backward direction, with its sliding movement being stopped at a specific position during the specific period to allow the movement of the pinion on the rack accompanying the second end of the rotary arm.

8. A panel driving device according to claim 7, further comprising a stroke restrictor that restricts rotating strokes of the rotary arms, and a holder that resiliently holds the rack at the specific position, wherein the rack moves in a direction returning to the specific position by a holding force of the holder as the pinion is rotated at an initial stage of operation of the rotating mechanism; the rack is held at the specific position after the rack reaches the specific position, whereby the rotary arms are rotated by the restricted rotating strokes with the pinion and the rack held in mesh with each other; and the rack moves in a direction away from the specific position against the holding force of the holder as the pinion is rotated after the rotary arms are rotated by the restricted rotating strokes.

9. A panel driving device according to claim 7, wherein the rotating mechanism includes a gear that drives the panel, a motor that rotates the gear and a torque transmission portion that converts a rotating force of the gear into a panel rotating force, and the pinion is in mesh with the gear.

10. A panel driving device according to claim 9, comprising a stroke restrictor that restricts rotating strokes of the rotary arms and a holder that resiliently holds the rack at the specific position, wherein the rack moves in a direction returning to the specific position by a holding force of the holder as the pinion is rotated at an initial stage of operation of the rotating mechanism; the rack is held at the specific position after the rack reaches the specific position, whereby the rotary arms are rotated by the restricted rotating strokes with the pinion and the rack held in mesh with each other; and the rack moves in a direction away from the specific position against the holding force of the holder as the pinion is rotated after the rotary arms are rotated by the restricted rotating strokes.

11. A panel driving device according to claim 10, wherein the holder includes:

a rack slider slidable together with the rack relative to the fixed support member and movable support member;

front and rear restriction members arranged to hold the rack slider therebetween at front and rear sides of the rack slider, the restriction members being mounted on the fixed support member to move in forward and backward directions;

a tension spring that couples the front and rear restriction members in forward and backward directions;

a front stopper that stops the front restriction member from moving so further backward as to move the rack beyond the specific position; and a rear stopper that stops the rear restriction member from moving so further forward as to move the rack beyond the specific position; and wherein the rack and the rack slider move in the direction returning to the specific position by a tensile force of the tension spring as the pinion is rotated at the initial stage of operation of the rotation mechanism; the pinion is rotated with the rack and the rack slider being held stationary after the rack and the rack slider reach the specific position, whereby the movable support member and the pinion slide to rotate the rotary arms; and the rack slider moves in the direction away from the specific position against tensile force of the tension spring as the pinion is rotated after the rotary arms are rotated by the restricted rotating strokes.

12. A panel driving device according to claim 11, further comprising a position detector that detects relative position of the movable support member and the rack slider.

13. A panel driving device according to claim 11, wherein the fixed support member includes a horizontal base plate and side plates vertically extending from opposite lateral sides of the base plate; the movable support member and the rack slider are mounted on the fixed support member to slide on the horizontal base plate; and the stroke restrictor is provided one each of the side plates.

14. A panel driving device according to claim 13, further comprising a position detector that detects relative position of the movable support member and the rack slider.

15. A panel driving device according to claim 13, wherein the stroke restrictor includes a cam groove formed on one of the rotary arm and the side plate, and a cam follower formed on the other of the rotary arm and the side plate, and a rotating stroke of each rotary arm is restricted by length of the cam groove.

16. A panel driving device according to claim 15, further comprising a position detector that detects relative position of the movable support member and the rack slider.

17. A panel driving device according to claim 1, wherein the support member includes a fixed support member and a movable support member slidable in forward and rearward directions relative to the fixed support member, the second ends of the rotary arms are pivotally supported by the movable support member though transversely extending support shafts to rotate the rotary arms about the support shafts; the panel driving device further comprises a transformation mechanism that transforms the sliding movement of the movable support member into rotary movement of the rotary arms with the second ends of the rotary arms moving with the movable support member; and the driving force of the rotating mechanism is used for sliding the movable support member only during the specific period.

18. A panel driving device according to claim 1, wherein the rotation mechanism rotating the panel between the upright position and the swung position while the rotary arms are not turned.

* * * * *